(12) United States Patent
Meyer

(10) Patent No.: US 6,690,807 B1
(45) Date of Patent: Feb. 10, 2004

(54) HEARING AID

(75) Inventor: Serge Eduard Hektor Meyer, Oberlunkhofen (CH)

(73) Assignee: Erika Köchler, Wollerau (CH)

( * ) Notice: Subject to any disclaimer, the term of this patent is extended or adjusted under 35 U.S.C. 154(b) by 0 days.

(21) Appl. No.: 09/959,177

(22) PCT Filed: Apr. 19, 2000

(86) PCT No.: PCT/IB00/00479

§ 371 (c)(1), (2), (4) Date: Dec. 27, 2001

(87) PCT Pub. No.: WO00/63741

PCT Pub. Date: Oct. 26, 2000

(30) Foreign Application Priority Data

Apr. 20, 1999 (EP) .............................. 99107807

(51) Int. Cl.⁷ ............................................. H04R 25/00
(52) U.S. Cl. ................. 381/327; 381/328; 381/329; 381/322; 381/381; 351/123; 351/111; 351/41; 351/158; 455/344; 2/12; 2/13
(58) Field of Search ................ 381/327, 381, 381/328, 330, 329, 322; 351/123, 111, 41, 158; 455/344, 89, 396, 182, 186, 158; 2/13, 12

(56) References Cited

U.S. PATENT DOCUMENTS

| | | | | |
|---|---|---|---|---|
| 2,207,705 A | * | 7/1940 | Cox | |
| 2,792,457 A | * | 5/1957 | Zapelloni | |
| 2,946,394 A | * | 6/1960 | Smith | |
| 2,999,136 A | * | 9/1961 | Holt | |
| 3,035,127 A | * | 5/1962 | Strzalkowski | |
| 3,059,066 A | * | 10/1962 | Hillmeyer | |
| 3,934,100 A | | 1/1976 | Harada | 179/182 R |
| 3,946,168 A | * | 3/1976 | Preves | |
| 4,375,016 A | | 2/1983 | Harada | 179/182 R |
| 5,029,216 A | * | 7/1991 | Jhabvala | |
| 5,335,285 A | * | 8/1994 | Gluz | |
| 5,579,400 A | * | 11/1996 | Ballein | |
| 5,606,743 A | * | 2/1997 | Vogt | |
| 5,608,808 A | * | 3/1997 | Da Silva | |
| 5,715,323 A | * | 2/1998 | Walker | |
| 5,717,479 A | * | 2/1998 | Rickards | |
| 5,737,436 A | * | 4/1998 | Boyden | |
| 6,010,216 A | * | 1/2000 | Jesiek | |
| 6,176,576 B1 | * | 1/2001 | Green et al. | |
| 6,233,345 B1 | * | 5/2001 | Urwyler | |

FOREIGN PATENT DOCUMENTS

| | | |
|---|---|---|
| DE | 1724439 | 6/1956 |
| DE | 9404882 | 6/1994 |
| DE | 9314924 | 3/1995 |
| EP | 0579238 | 1/1994 |
| GB | 1012633 | 12/1965 |
| GB | 1089238 | 11/1967 |

* cited by examiner

Primary Examiner—Curtis Kuntz
Assistant Examiner—Dionne Harvey
(74) Attorney, Agent, or Firm—Ladas & Parry

(57) ABSTRACT

The invention relates to a listening assistance device (1) comprising hearing modules (3) mounted on the ends of the arms of an eyeglass frame (2), said modules being designed to support the eyeglass frame on the ear of the user. The hearing modules also have a formed part (5) which extends into the auditive canal without closing the latter and which includes the sound outlet hole (6) of the module. The modules comprise a speech spectrum frequency response and linear dynamics in order to improve speech intelligibility. This makes it possible to provide a listening assistance device compensating for mild hearing loss that can be produced easily and economically, is more comfortable to use and is not regarded at first sight as a hearing aid by an observer.

20 Claims, 2 Drawing Sheets

HEARING AID

CROSS REFERENCE TO RELATED APPLICATIONS

This application claims the priority of the European patent application No. 99 107 807.2, which has been filed on Apr. 20, 1999, of which the entire disclosure shall be considered included herein by reference.

1. Technical Field

The invention relates to a listening assistance device according to claim 1, a method of providing such a device and a spectacle frame temple for practicing the method.

2. Prior Art

Hearing aids in combination with spectacles and to be carried in the ear are known, whereby these hearing aids are made to suit the ear to be equipped with same in a classical manner in that the shape of the part projecting into the ear is made to conform to the auditory passage and to close the auditory passage acoustically off, and in that the properties of the sound amplification of the hearing aid (acoustic amplification, frequency characteristic, dynamics) are adapted to the loss of hearing of the user of the hearing aid. The causes, as well known, a time consuming and costly expenditure of work of an ear physician and/or the hearing aid acoustics specialist with the person having an impaired hearing.

Also known are, furthermore, conventional headphones in combination with spectacles, for instance by the EP-A-0 579 238.

By many persons, however, a slightly growing deficiency of hearing as a symptom of age after about 40 years and older occurs which is not in need of an examination by a ear physician or a use of a classical hearing aid. This deficiency of hearing is specifically notable during a conversation by a reduced understanding of the spoken words. It is, therefore, desirable to bring about an improvement of the hearing capability of these persons having a slightly impaired hearing capability in a simple and low cost manner, whereby the appearance of the person should not be changed in such a manner that the person is recognized as carrying a hearing aid and is judged as having a impaired hearing.

SUMMARY OF THE INVENTION

Thus, it is the object of the invention to provide a simple and low cost listening assistance device which can be carried without any problems and inconspicuous and counteracts specifically the reduced understanding of spoken matter.

This object is met by the features of claim 1.

Because a hearing module is foreseen in combination with spectacles in such a manner that this hearing module forms the support of the spectacles in the ear an inconspicuous appearance not reminding of hearing aids and also an easily placeable device is arrived at. Due to the part of the hearing module which projects into the auditory channel, which must not close same acoustically completely off and, therefore, must not be individually produced, a direct sound coupling into the ear and a sound coupling into the ear through the hearing module is arrived at together with a low cost production. Furthermore, the not complete closing off of the auditory channel leads to an excellent wearing comfort without a sensation of pressure.

The listening assistance device includes preferably angled spectacle frame temples which leads to a specifically good positioning of the spectacles, an excellent wearing comfort and an inconspicuous wearing.

It is, furthermore, preferred to have the hearing module mounted adjustable at the end of the temple; to this end, with an asymmetrical location of the projection relative to the longitudinal axis of the hearing module a rotation around its longitudinal axis is preferred. This allows an individual positioning of the sound exit of the hearing module to the auditory channel for a minimal acoustic retroaction and allows, furthermore, an especially simple mounting of the hearing module onto the temple by means of a ring for wed thereat.

The invention has, furthermore, the object of a as simple as possible provision of a listening assistance device. This object is met by the method according to claim 11. Furthermore, a temple portion for its practicing shall be provided. This is characterized by the features of claim 12.

BRIEF DESCRIPTION OF THE DRAWINGS

In the following examples of embodiments of the invention will be explained more in detail with reference to the drawings. There is shown in FIG. 1 a schematic perspective illustration of a listening assistance device according to the invention.

PREFERRED EMBODIMENTS OF THE INVENTION

Figure 1:
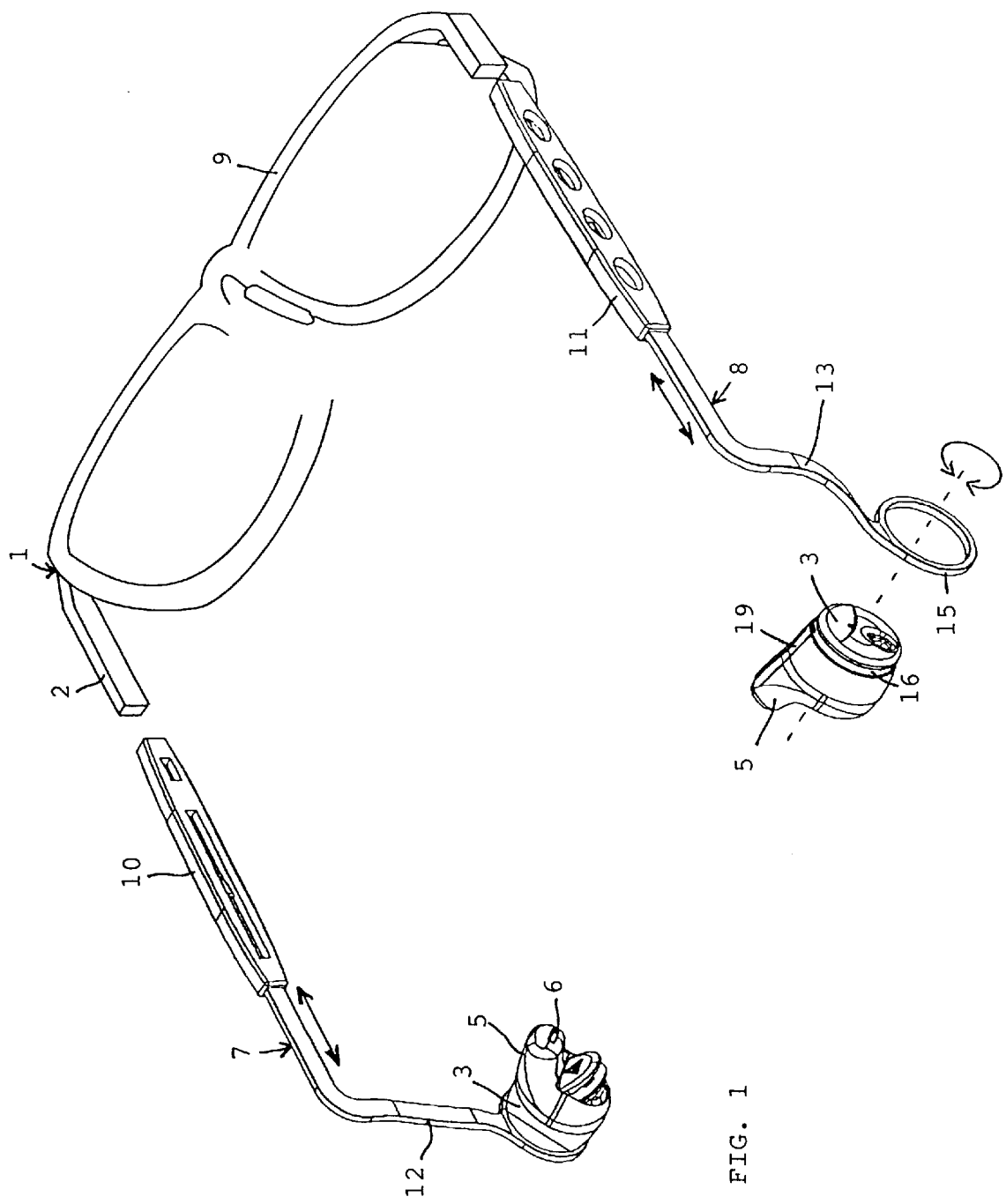
Figure 2:
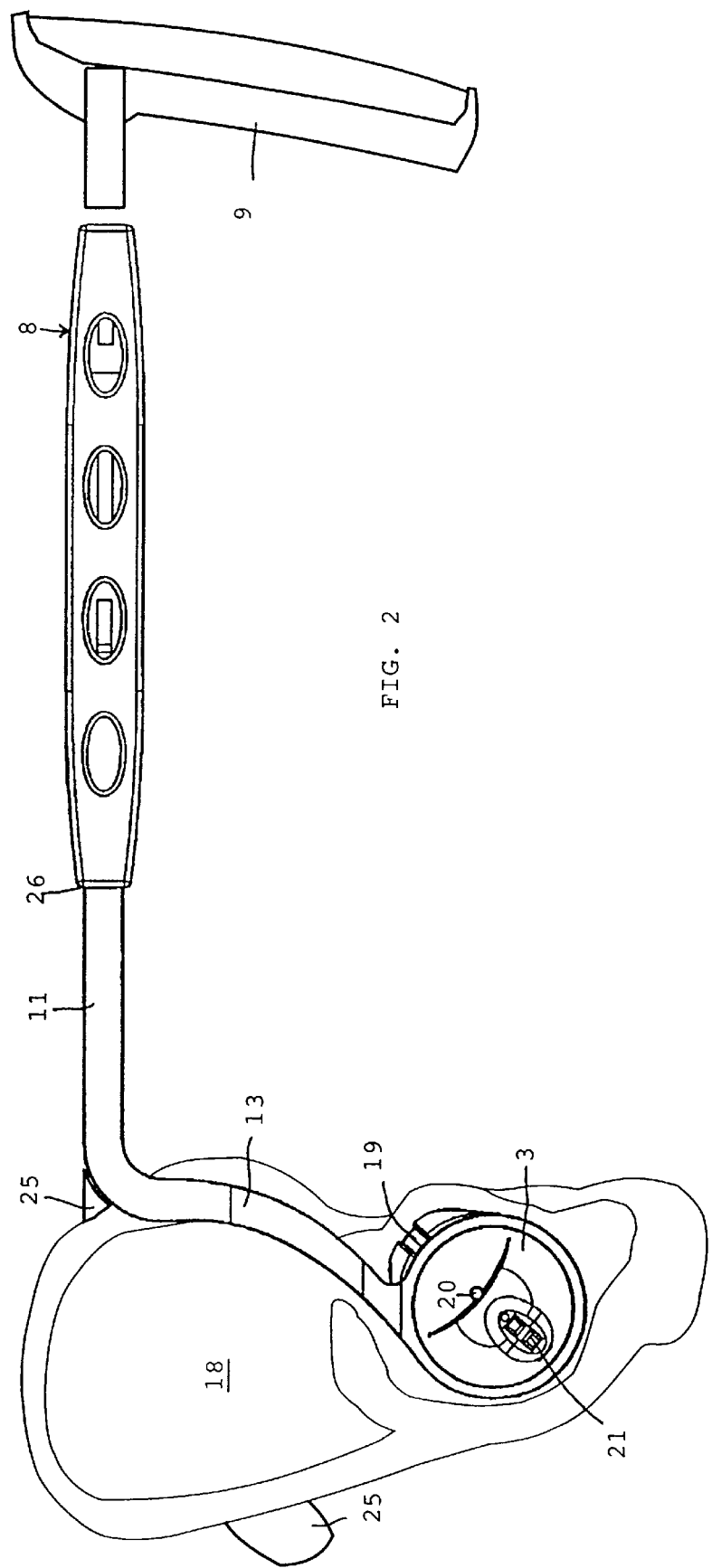
FIG. 2 a side view of the listening assistance device of FIG. 1.

The FIGS. 1 and 2 illustrate an embodiment of the listening assistance device 1 in a perspective view and side view, respectively. The embodiment includes a only partly illustrated spectacle frame 2 which comprises a frame 9 for the lenses and temples 7 and 8. A hearing module 3 is mounted at the end of both temples at the side facing the ear, whereby in FIG. 1 the left hearing module is illustrated set into the temple and the hearing module 3 at the right side of the Figure is illustrated separate from the temple. The hearing module 3 forms the support of the spectacle frame at the ear, whereby the hearing module 3 is designed for being supported in the ear such as visible in FIG. 2.

The hearing module is of a basically conventional design and includes specifically a microphone of which the sound entry opening 20 is visible in FIG. 2, which has an electronic amplification circuit and a microphone connected to its input, and a sound transducer as well, which transforms the amplified sound signals again into acoustical signals. The exit opening 6 for the sound signals is foreseen at a projection 5 of the hearing module which projects into the auditory channel when the hearing module 3 sits in the ear. In FIG. 1, furthermore, a battery case is illustrated at the left hearing module in an open state, into which battery case a battery for supplying the electrical amplifier is placed.

The projection 5 is of a fixedly set design and is not adapted to the individual shape of the auditory channel of the user. The design of the projection 5 is, furthermore, such that it does not close the auditory channel of a grown-up wearer completely off and accordingly does not close it off completely against the surroundings. This allows at the one hand a production of the hearing module 3 with a fixed predetermined standard housing for all users, which can be produced industrially and thus allows a low-cost production. This also takes into consideration that the hearing module is merely an auxiliary device for the only slightly reduced but otherwise intact hearing capability of the wearer of the listening assistance device. Furthermore, the not closing off of the auditory channel increases the comfort of wearing the device considerably. At the illustrated preferred embodiment the projection is designed towards the front (towards the sound exit opening 6) conically in order to prevent a complete closing off of the auditory channel. It is, furthermore, preferred to have a channel 19 formed at the outer side of the housing of the hearing module which also ensures that the auditory channel is not closed off. Both measures allow sound to enter the ear directly and to avoid, furthermore, the uncomfortable pressure in the ear.

In the preferred embodiment the spectacle frame temples 7 and 8 are designed in such a manner that proceeding from the frame 9 for the lenses they extend initially rectilinearly backwards, whereby the substantially rectilinear portions are identified in the Figures by 10 and 11. The rectilinear portions are followed by angled portions 12 and 13 of the respective temples which extend at an angle downwards towards the outer ear shell. A hearing module is arranged at the end of both angled portions. This preferred design leads at the one hand to a correct fit of the spectacles and a correct position of the frame 9 for the lenses resp., which is advantageous regarding the optical properties of the spectacles if the lenses used are correction lenses. At the other hand it has been proven that due to this design an excellent wearing comfort of the spectacles and the temples, respectively at the ear can be achieved.

For an individual adjusting of the listening assistance device the temples are preferably designed in such a manner that their longitudinal extent can be adjusted. To this end a bipartite design can be foreseen in the area of the rectilinear temple portions 10 and 11, which allows a telescope-like pulling apart or pushing together of the temples which is illustrated in FIG. 1 by an arrow. Detents are preferably foreseen which allow a locking of the temple in predetermined length positions. Furthermore, preferably a possibility of an adjusting of the position of the hearing module 3 at the temple is foreseen. At the illustrated preferred embodiment the housing of the hearing module 3 is designed substantially cylinder shaped and is mounted in such a manner to the temple that it is equipped at its end with a ring 15, in which the hearing module 3 with a groove 16 bordered by beads can be mounted in such a manner that a clamped mounting of the hearing module 3 in the ring 15 is arrived at. With this design a simple adjusting capability by a rotating of the cylinder shaped hearing module 3 around its longitudinal axis in the ring 15 is arrived at which is also illustrated in FIG. 1 by an arrow. Due to the preferred asymmetrical placing of the projection 5 relative to the longitudinal axis of the hearing module 3 it is possible to also adjust the position of the projection 5 relative to the auditory channel by a rotating of the hearing module 3. By means of this a simple capability of an adjusting into a position is arrived at, in which the projection 5 does no project in a disturbing manner into the auditory channel of the user of the listening assistance device.

It is further preferred at the listening assistance device that the hearing module 3 has a fixedly preset acoustical amplification. The hearing module is merely switched on and off by the user through a switch 21 when the function as listening assistance device is needed and not needed anymore, respectively. Both ears which are provided with a hearing module experience thereby the same sound amplification and thus experience no change of the hearing impression which they are used to. The amplification of the hearing module 3 can, thereby, be set during the production to a fixed predetermined value which may amount to e.g. 10 to 20 db which is sufficient for an average slight loss of hearing. If needed, various hearing modules 3 could be made available which have various fixed grades of amplification and which can be mounted to the temple of the listening assistance device 1 by an exchanging; hearing modules with an amplification which can be adjusted by means of a potentiometer can also be used.

A listening assistance device according to the invention is preferably provided in that a temple, or if the frame for the lenses is already equipped with a temple part adapter in which the hearing module is received, is mounted to the lens frame 9. However, it is also possible to arrange a conventionally shaped temple part of the frame for the lenses in place of the temple portion so that the frame 9 for the lenses of the listening assistance device can also be worn as conventional spectacles. This is indicated in FIG. 2 by the temple part 25 which, alternatively to the illustrated temple portion with a hearing module can be mounted to the frame for the lenses. The frame 9 for the lenses can, thereby, be already provided with a temple part which extends e.g. up to the point 26. Into this temple part there is inserted either the conventional temple part 25 or the adapter equipped with the hearing module for providing the listening assistance device. The lens frame may be equipped with lenses having an optical correction or with such without any correction, specifically however, with lenses for providing reading spectacles, e.g. with several predetermined diopter values, e.g. five diopter values from 1 to 3 dioptries.

The listening assistance device is preferably equipped, such as is illustrated, with two hearing modules. A hearing with both ears allows a best directional hearing and accordingly an improved understanding of spoken words in a noisy surrounding. Both ears are provided with the same acoustical amplification with the same frequency characteristic so that the selectively of the stereophonic hearing with both ears is maintained. The frequencies in the range of the spoken word are preferably amplified by the hearing modules and, therefore, the understanding of speech in a noisy surrounding is improved. The dynamic is, furthermore, linear. It is, however, also possible to arrange a hearing module 3 at one side only and to arrange a conventional temple part 25 at the other side. It is, furthermore, also possible to arrange a corresponding button in place of the hearing module 3 which allows a supporting of the frame in the ear shell without incorporating the sound amplification function. In this case it is possible to wear the spectacles by a removing of the hearing module 3 and an inserting of a corresponding button into the ring 15 as conventional spectacles without the hearing aid function, but with the illustrated angled temples.

What is claimed is:

1. Listening assistance device (1) comprising at least one hearing module (3) for supporting a portion of a spectacle frame (2) from an ear, the hearing module comprising a microphone, an amplifier and an acoustics transducer which converts the amplified microphone signals into acoustical signals, characterized in that the hearing module is equipped with a housing projection (5) which projects into the auditory channel in a not closing same off manner and which includes the sound exit opening (6), and in that the spectacle frame (2) comprises at least one spectacle temple (7, 8) with a first portion (10) extending from the frame (9) for the lenses substantially rectilinearly towards the back, and a second portion (12, 13) extending from the first portion at an angle downwards which carries at its free end the hearing module (3), characterized in that the hearing module (3) comprises a substantially cylinder shaped housing on which the projection (5) is arranged asymmetrically relative to its longitudinal axis, and characterized in that the hearing module is rotatable around its longitudinal axis.

2. Listening assistance device (1) according to claim 1, characterized in that the projection (5) comprises at least in part a conical shape.

3. Listening assistance device (1) according to claim 2, characterized in that the hearing module comprises a means, specifically a channel (19) for an ensuring of a direct sound connection in the ear.

4. Listening assistance device according to claim 2, characterized in that the spectacle frame comprises temples (7, 8) with an adjustability of their length.

5. Listening assistance device according to claim 3, characterized in that the spectacle frame comprises temples (7, 8) with an adjustability of their length.

6. Listening assistance device according to claim 3, characterized in that the hearing module is arranged at the spectacle frame to be adjustable regarding its position.

7. Listening assistance device according to claim 2, characterized in that the hearing module is arranged at the spectacle frame to be adjustable regarding its position.

8. Listening assistance device according to claim 4, characterized in that the hearing module is arranged at the spectacle frame to be adjustable regarding its position.

9. Listening assistance device (1) according to claim 1, characterized in that the hearing module comprises a means, specifically a channel (19) for an ensuring of a direct sound connection in the ear.

10. Listening assistance device according to claim 9, characterized in that the spectacle frame comprises temples (7, 8) with an adjustability of their length.

11. Listening assistance device according to claim 10, characterized in that the hearing module is arranged at the spectacle frame to be adjustable regarding its position.

12. Listening assistance device according to claimed 9, characterized in that the hearing module is arranged at the spectacle frame to be adjustable regarding its position.

13. Listening assistance device according to claim 1, characterized in that the spectacle frame comprises temples (7, 8) with an adjustability of their length.

14. Listening assistance device according to claim 13, characterized in that the hearing module is arranged at the spectacle frame to be adjustable regarding its position.

15. Listening assistance device according to claim 1, characterized in that the hearing module is arranged at the spectacle frame to be adjustable regarding its position.

16. Listening assistance device according to claim 1, characterized in that the hearing module comprises a fixed set amplification.

17. Listening assistance device according to claim 1, characterized in that the hearing module comprises a substantially language specific frequency characteristic and a linear dynamic.

18. Listening assistance device according to claim 1, characterized in that the hearing module comprises a fixed set amplification in the range of 10 to 20 db.

19. Method of providing a listening assistance device, characterized in that a hearing module with a microphone, an amplifier and a transducer is arranged at the frame temple or a frame temple part of a spectacle frame in such a manner that it forms a support of the temple or temple part in the ear, whereby the hearing module has a housing projection which projects into the auditory channel not closing same off, and in that the temple or the temple part is mounted to a lens frame provided with lenses or adapted to receive lenses, or in that the temple part is mounted to a second temple part arranged at the lens frame, whereby the temple (7, 8) or the temple part is provided with a first portion (10, 11) extending from the lens frame substantially rectilinearly backwards and a second portion (12, 13) extending from the first portion at an angle downwards, which carries at either of its free and the hearing module (13), characterized in that the hearing module (3) comprises a substantially cylinder shaped housing on which the projection (5) is arranged asymmetrically relative to its longitudinal axis, and characterized in that the hearing module is rotatable around its longitudinal axis.

20. Temple or temple part for practicing the method according to claim 10, characterized by hearing module with a microphone, amplifier and acoustics transducer arranged at the temple or temple part which is designed for a supporting of the temple in the ear and provided with a housing projection adapted to project into the auditory channel, whereby the temple (7, 8) or the temple part is provided with a first portion (10, 11) extending from the frame for the lenses substantially rectilinearly backwards, and a second portion (12, 13) extending from the first portion at an angle downwards and which carries at each of its free ends the hearing module (3).

\* \* \* \* \*